(12) United States Patent
Naske

(10) Patent No.: US 7,254,264 B2
(45) Date of Patent: Aug. 7, 2007

(54) METHOD AND DEVICE FOR GENERATING 3D IMAGES

(75) Inventor: Rolf-Dieter Naske, Kakenstorf (DE)

(73) Assignee: NewSight Corporation, New York, NY (US)

( * ) Notice: Subject to any disclaimer, the term of this patent is extended or adjusted under 35 U.S.C. 154(b) by 658 days.

(21) Appl. No.: 10/240,556

(22) PCT Filed: Apr. 1, 2001

(86) PCT No.: PCT/EP01/03707

§ 371 (c)(1),
(2), (4) Date: Oct. 1, 2002

(87) PCT Pub. No.: WO01/76258

PCT Pub. Date: Oct. 11, 2001

(65) Prior Publication Data

US 2003/0098907 A1 May 29, 2003

(30) Foreign Application Priority Data

Apr. 1, 2000 (DE) .............................. 100 16 074

(51) Int. Cl.
*G06K 9/00* (2006.01)
(52) U.S. Cl. .................................................. 382/154
(58) Field of Classification Search ................. 382/154
See application file for complete search history.

(56) References Cited

U.S. PATENT DOCUMENTS 4,781,435 A 11/1988 Lippmann et al.
4,925,294 A 5/1990 Geshwind et al.

(Continued)

FOREIGN PATENT DOCUMENTS

EP 0 665 697 A2 8/1995

(Continued)

OTHER PUBLICATIONS

Conversion System of Monocular Image Sequence to Stereo Using Motion Parallax, SPIE vol. 3012.

*Primary Examiner*—Joseph Mancuso
*Assistant Examiner*—Hadi Akhavannik
(74) *Attorney, Agent, or Firm*—Renner, Otto, Boisselle & Sklar, LLP

(57) ABSTRACT

The invention relates to a method and to a device for generating 3D images, according to which an image of a second sequence of images is generated in addition to an image of a first sequence of 2D images at an interval that can be determined via an approximation variable ($\alpha$). A measure of similarity ($d_k$) between successive images of the first sequence is determined and compared with threshold values ($\delta_0 < \delta_1 < \delta_2$) so as to modify the approximation variable ($\alpha$) depending thereon in such a manner that the stereo base width does not turn unnaturally large. A phase analyzer (12) is used to determine a prevailing direction of movement in successive images of the first sequence of images and a phase converter (16) is used to allocate the image of the first and second sequence of images to a left-hand or right-hand viewing channel depending on a prevailing direction of movement in successive images of the first sequence.

8 Claims, 3 Drawing Sheets

U.S. PATENT DOCUMENTS

Figure 1:
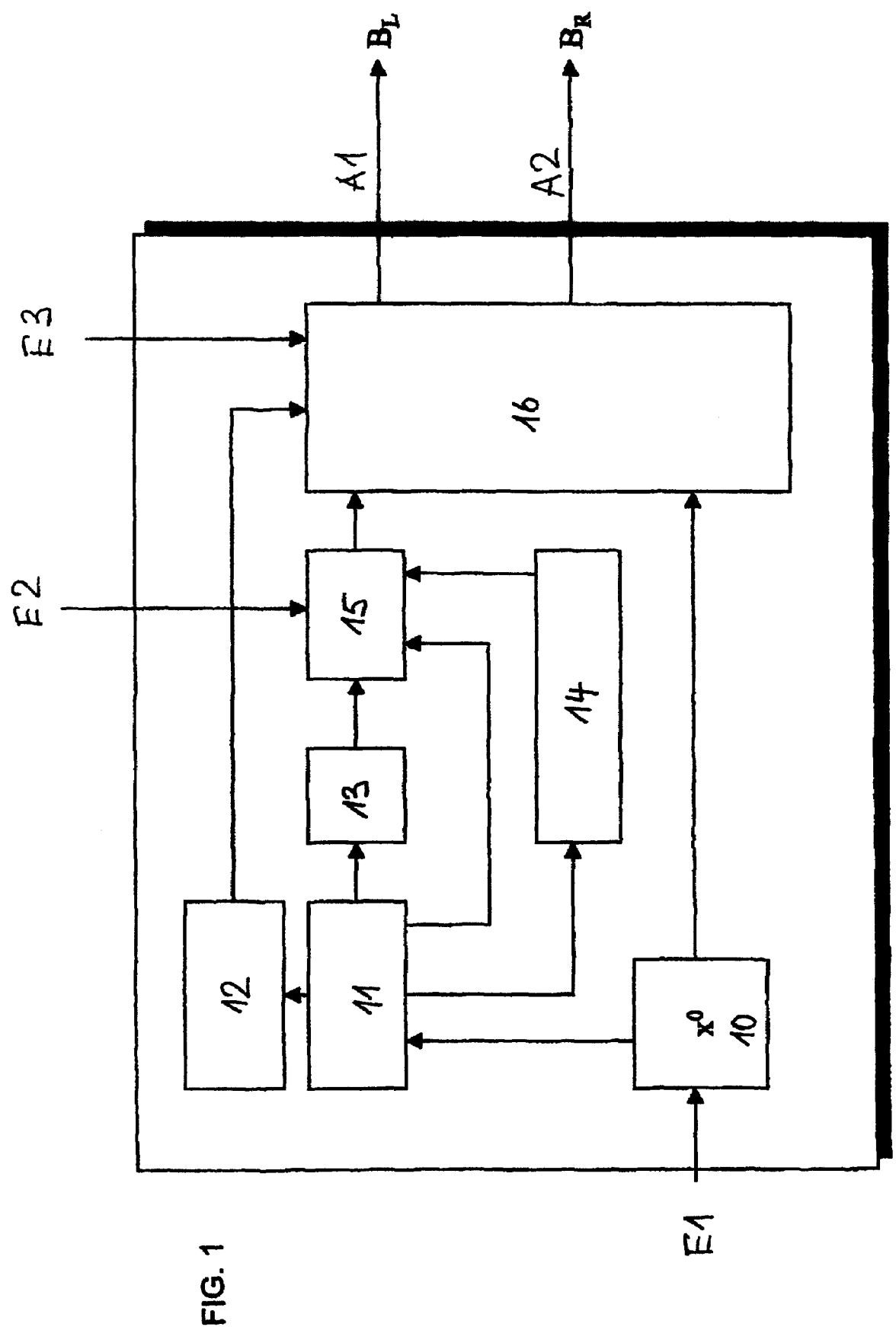

| | | |
|---|---|---|
| 5,510,832 A | 4/1996 | Garcia |
| 5,588,067 A * | 12/1996 | Peterson et al. ............. 382/103 |
| 5,717,415 A * | 2/1998 | Iue et al. ........................ 345/8 |
| 5,739,844 A * | 4/1998 | Kuwano et al. ............... 348/43 |
| 6,445,833 B1 * | 9/2002 | Murata et al. ............... 382/285 |
| 6,584,219 B1 * | 6/2003 | Yamashita et al. .......... 382/154 |

FOREIGN PATENT DOCUMENTS

| | | |
|---|---|---|
| EP | 0 714 077 A2 | 5/1996 |
| WO | WO 99/03068 | 1/1999 |

* cited by examiner

METHOD AND DEVICE FOR GENERATING 3D IMAGES

The invention relates to a method and a device for the generation of 3-D images.

Three-dimensional imaging is often used to analyze objects, particularly in the fields of medicine and science. Various methods with which television pictures in particular can be produced in three dimensions have also been developed for general consumer applications.

Among said methods, there is a basic distinction between sequential image transmission, in which the images for the right eye and the left eye are transmitted alternately one after the other or saved to a storage medium, and parallel transmission, in which the images are transmitted on two separate channels.

One particular disadvantage of sequential image transmission in connection with conventional television systems is the fact that the refresh rate is reduced to 25 images per second for each eye. This creates an unpleasant flickering for the viewer. Of course, this limitation does not occur when the image sequences are each transmitted on their own channel (left or right). However, problems may still arise with synchronizing both channels and due to the requirements placed on the receiver, which must be able to receive and process two channels simultaneously. This is not possible for most systems generally available on the market.

Signal transmission and processing will likely be entirely digital in future television systems. In such systems, every image is broken down into individual pixels which are transmitted in digitized format. In order to reduce the bandwidth required for this process, the appropriate compression methods are used; however, these create problems for stereo transmission.

For example, using block coding methods with a reasonable rate of compression, it is generally not possible to reconstruct every individual line of an image precisely. In addition, interframe coding techniques, such as MPEG-2, do not allow one to transmit or save stereo images in a sequential image format, because image information from one image is still contained in another image, creating the so-called "crosstalk effect", which makes clear separation of the right image from the left impossible.

Other methods for generating a three-dimensional image sequence from a two-dimensional image sequence are disclosed in DE 35 30 610 und EP 0 665697. An autostereoscopic system with an interpolation of images is disclosed in EP 0 520 179, whereas in "Huang: Image Sequence Analysis" (published in Springer Verlag) problems of the recognition of motion areas in image sequences are discussed.

Therefore, the problem behind the invention is to create a method and a device of the type specified in the introduction with which it is possible to generate 3-D images with a very natural three-dimensional image impression even if using the transmission and/or compression methods described in the introduction.

Figure 2:
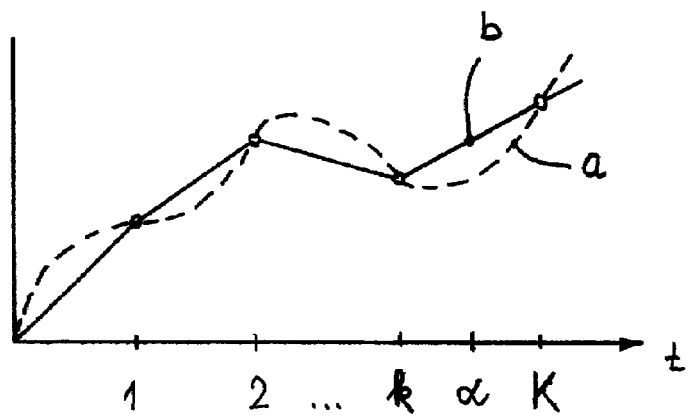
Figure 3:
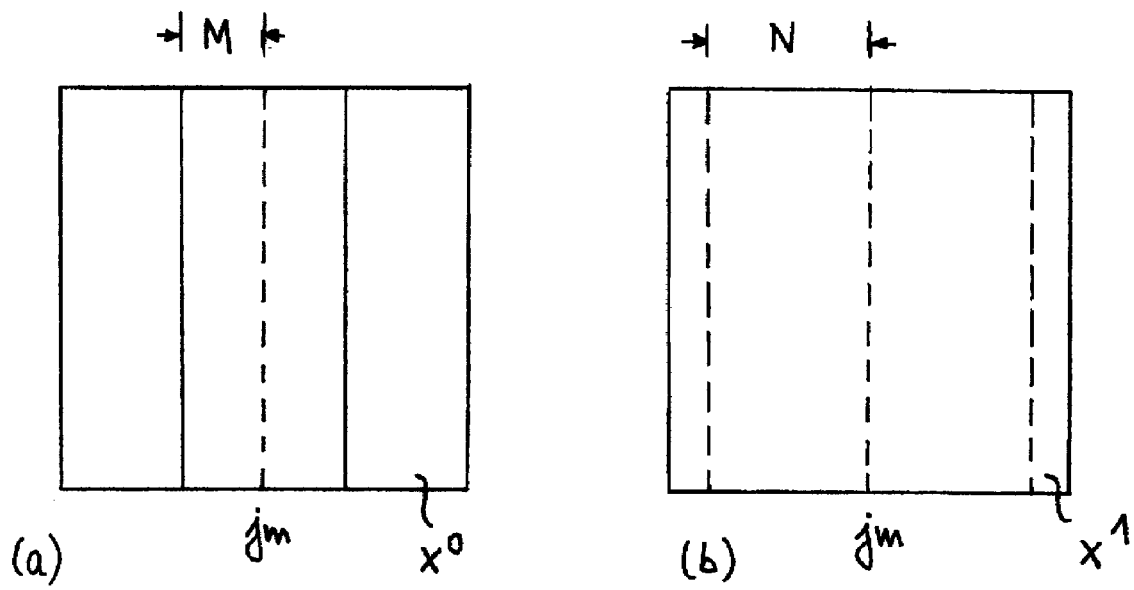
Figure 3:
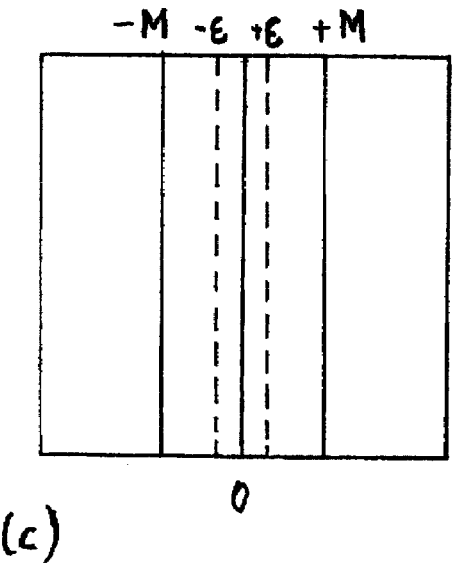

Additional details, features, and advantages of the invention may be seen from the following description of a preferred embodiment with reference to the drawings. They show:

FIG. 1 a schematic block diagram of circuitry according to the invention;

FIG. 2 a graphical representation of an actual image sequence and of a scanned image sequence;

FIGS. 3a-c schematic representations of phase control in sequential images; and

Figure 4:
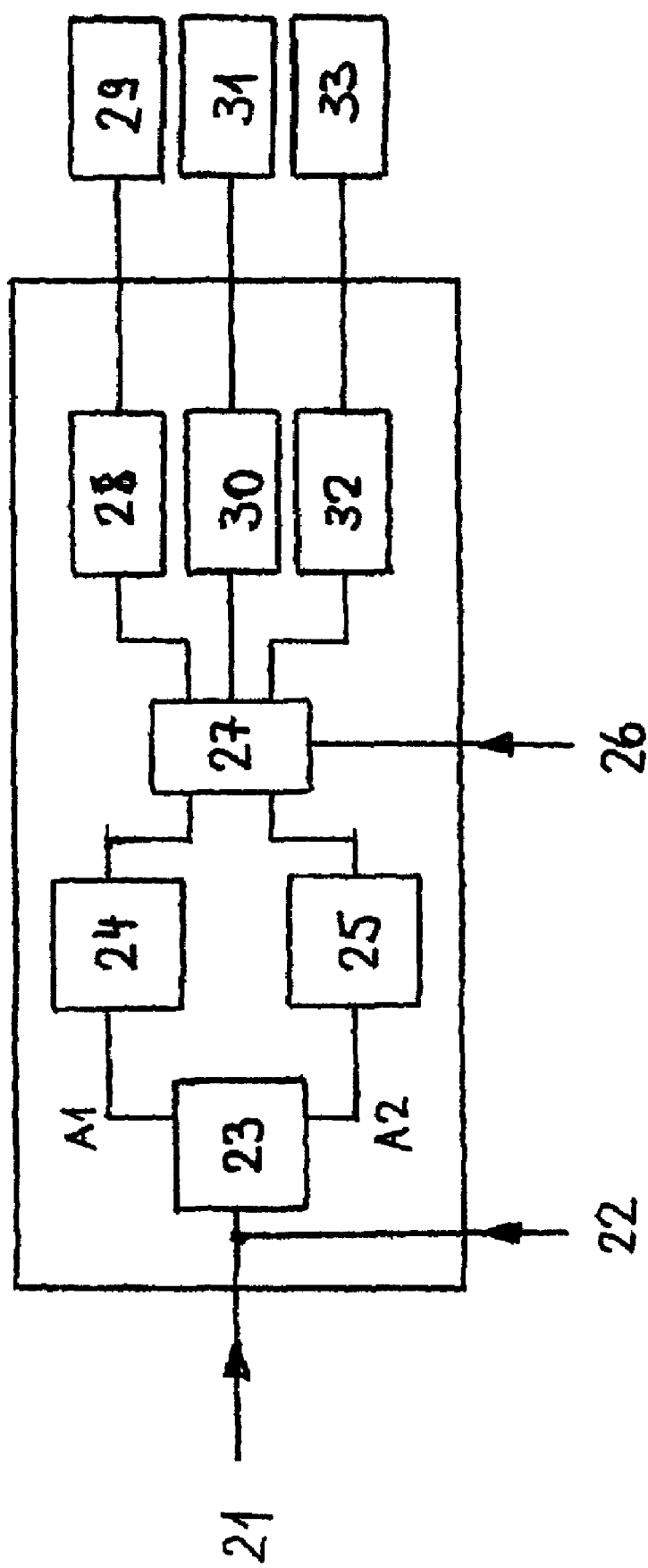

FIG. 4 a schematic block diagram of one imaging application of the invented device.

The basic components of a device according to the invention and their interconnections are schematically represented in FIG. 1. The system comprises a first input E1, through which the two-dimensional images generated by a camera and transmitted across a transmission path are directed to an A/D converter 10 and digitized. The digitized images are then directed to an image storage device 11 and a phase selector 16. The images saved in the image storage device 11 are analyzed by a phase analyzer 12, the input of which is connected to the image storage device 11 and the output of which is connected to the phase selector 16. In addition, a long-term storage device 13 is connected to the image storage device 11 for storing images from this storage device and the output of which is connected to an image generator 15. Furthermore, the image generator 15 is also connected to another output of the image storage device 11 and of a motion analyzer 14, to which images from the image storage device 11 are directed. In addition, the device comprises a second input E2 for manual motion control connected to the image generator 15, as well as a third input E3 for manual phase control attached to the phase selector 16. A right or left stereo image $B_L$, $B_R$ is attached to two outputs of the phase selector 16, which are connected to a first or second output A1, A2 of the device.

A second image sequence is generated by this device based on a (first) image sequence recorded in two-dimensions. Together with the first image sequence, the second sequence makes it possible to view the originally two-dimensional images in three dimensions when the first and second image sequences are transmitted to the left or right eye. The second image sequence is defined according to the following description based on image information resulting from the motion in the first image sequence. The following definitions apply:

$x_{ij}$ is a digitized image at time t with horizontal resolution I and vertical resolution J. The scan rate is $\Delta t$, so that the following formula is derived for an image scanned at time k and saved in the image storage device 11:

$$x^k := x_{ij}(t - \Delta tk)$$

The most recent K images are located in the image storage device 11 with length K. $0 \leq \alpha \leq k$ is a real number representing the time interval of a given image $x^k$, during which a (synthetic) image of the second image sequence is generated ("approximation variable"). In addition, $B_L$ represents the given displayed left image and $B_R$ the given displayed right image.

It is assumed that a fixed value is given to $\alpha$. The images $x^k$ in the image storage device 11 are viewed as sample values (scanned image sequence according to curve b in FIG. 2) of a constant function (actual image sequence according to curve a in FIG. 2). Various methods of approximation may be applied to this function. The following explanations relating to FIG. 2 refer to a linear spline approximation.

However, other methods of approximation may be used as appropriate; for example. higher-level or polynomial approximations.

FIG. 2 shows a image sequence in two-dimensional (I/J-) space. The second image sequence is calculated by the image generator 15 as follows: First, $\alpha_u$ is calculated as the largest whole number which is smaller than $\alpha$. Next, $\alpha_o$ is calculated as the smallest whole number which is larger than $\alpha$. So:

$B_L := x^0$ $B_R := x^{\alpha o}(\alpha - \alpha_u) + x^{\alpha u}(1 - \alpha + \alpha_u)$ where the image sequence $B_L$ for a left viewing channel (left eye) is calculated by the given actual images of the first image sequence $x^0$, $x^1$, etc., and the (second) image sequence $B_R$ is calculated by approximation for a right viewing channel (right eye).

This calculation is performed separately by the image generator 15 for all of the pixels $x_{ij}$ in a selected color space (ROB or YUV); that is:

$B_R := b_{ij}^{(Y,U,V)} := (x_{ij}^{\alpha o}(Y)(\alpha - \alpha_u) + x_{ij}^{\alpha u}(Y)(1 - \alpha + \alpha_u), x_{ij}^{\alpha o}(U)(\alpha - \alpha_u) +$
$x_{ij}^{\alpha u}(U)(1 - \alpha + \alpha_u), x_{ij}^{\alpha o}(V)(\alpha - \alpha_u) + x_{ij}^{\alpha u}(V)(1 - \alpha + \alpha_u)).$ In addition, automatic phase control is performed by the phase analyzer 12 to determine movements in sequential images of the first image sequence. It is assumed that $j_m := J/2$ is the horizontal midpoint of an image, so $x_{ij_m}^0$ with $0 \leq i \leq I$ is the middle column of the image $x^0$ at time t. Furthermore, $M < j_m$ is a selected whole number. Then:

$x_{ij}^{0s} := x_{ij}^0$ with $0 \leq i \leq I$ and $j_m - M \leq j \leq j_m + M$ will be defined as a scanned image, shown in vertical stripes in FIG. 3a. Said image comprises 2M+1 columns s around the horizontal midpoint $j_m$ of the image $x^0$.

Now, N is a fixed number with N>M, so:

$x_{ij}^{1s}$ with $0 \leq i \leq I$ and $j_m - N \leq j \leq j_m + N$ are defined as the search region (see FIG. 3b) in image $x^1$, in which the partial image with the greatest similarity to the scanned image $x_{ij}^{0s}$ is sought.

$d_1$ is the similarity of the scanned image to a partial image of equal size from the search region with a displacement position 1, where $-N \leq 1 \leq +N$.

If cross-correlation is chosen as a measure of similarity, $d_1$, is the result for the displacement position 1:

Formula (1):

$$d_1 := 1 - \sum_{i=0}^{I} \sum_{j=j_m-M}^{j_m+M} \frac{|x_{ij}^0 \cdot x_{ij-1}^1|}{\sqrt{(x_{ij}^0)^2 (x_{ij-1}^1)^2}}$$

Here, the value of 1 ranges from $-N$ to $+N$, where 1 represents the given displacement position of a partial image in the search region.

As an alternative to cross-correlation, a Euclidean distance or an absolute amount may also be chosen as a measure of similarity.

Thus, with this method, as indicated in FIGS. 3a and b, the scanned image $x^s$ (FIG. 3a) runs like a scanner across the search region (FIG. 3b) of the image $x^1$ (previous image) and looks for the region with the greatest similarity d, to the scanned image, where the similarity d, is calculated for every displacement position 1.

In addition, a whole number $\epsilon$ is defined, which may be called the moment of inertia and with which blurring is defined according to FIG. 3c. This is used to allow for camera movement which should not be considered displacement of the image. For the value of $\epsilon$, $-1 \leq \epsilon \leq 1$ approximately.

This analysis is performed substantially as follows. First, all measures of similarity $d_1$ for $-N \leq 1 \leq +N$ are calculated by the phase analyzer 12. Next, the measure of similarity $d_{mm}$ is chosen with the smallest value ($d_{mm} := \min d_1$) and the index $I_{mm}$ of this measure of similarity is determined. The values $I_{min}$ and $\epsilon$ are compared by the phase selector 16, and the phase selector 16 switches as a function of the results of the comparison as follows:

If $I_{mm} < \epsilon$, this means that the region of greatest similarity in the search region is displaced to the left, and thus the predominant direction of movement in sequential images $x^1$, $x^0$ of the first image sequence is indicated from left to right. This may result from the movement of an object in the images from left to right or from the panning of the camera from right to left. In this case, for the left image $B_L := x^0$ (i.e., the given image of the image sequence) and a calculated synthetic image (second image sequence) is selected for the right image BR. In addition, a "shift" indicator is set to "left" in the phase selector 16.

If $I_{min} > \epsilon$, this means that the region of greatest similarity in the search region is displaced to the right, and thus the predominant direction of movement in sequential images $x^1$, $x^0$ of the first image sequence is indicated from right to left. This may result from the movement of an object in the images from right to left or from the panning of the camera from left to right. In this case, a calculated synthetic image (second image sequence) is selected for the left image $B_L$ and for the right image $B_R := x^0$ (i.e., the given image of the image sequence). In addition, the "shift" indicator is set to "right".

If $|I_{mm}| < \epsilon$ and the indicator is set to "right", then a calculated synthetic image is selected for the left image $B_L$ (second image sequence) and for the right image $B_R := x^0$ (i.e., the given image of the image sequence).

Finally, if $|I_{min}| < \epsilon$ and the indicator is set to "left", then for the left image $B_L := X^0$ and a calculated synthetic image is selected for the right image (second image sequence).

The next image is then accessed and the same process is repeated for this image, beginning with the calculation of the minimum value of the measure of similarity $d_{min}$.

This automatic phase control or selection may also be switched off and, for example, replaced by manual switching using a keyboard via the device's third input.

Furthermore, the embodiment shown in FIG. 1 comprises the motion analyzer 14. which uses dynamic motion control or motion calculation to prevent the stereo base from becoming too large when there are large movements. In addition, this ensures that a certain minimum width of the stereo base is maintained during very slow movements before it disappears in images without any motion. The long-term storage device 13, from which images are accessed and used as images of the second image sequence when the movements are too slow, has been provided for this last purpose.

The measure of similarity $d_k$ at time $t_k$ is defined as follows:

Formula (2):

$$d_k := 1 - \sum_{i=0}^{I} \sum_{j=0}^{J} \frac{|x_{ij}^k \cdot x_{ij}^{k+1}|}{\sqrt{(x_{ij}^k)^2 \cdot (x_{ij}^{k+1})^2}}$$

Therefore, this measure of similarity is a function of the extent to which the entire contents of the next image in an image sequence differ from the contents of the previous image, and thus represents a measure of the speed of motion in the images.

Threshold values $\delta_0 < \delta_1 < \delta_2$ are defined for the analysis of said measure of similarity, where in the ideal case the measure of similarity $d_k = 0$ for an unchanged (constant) image at time $t_k$ in comparison to the previous image at time $t_k + 1$. However, because there is always a certain amount of background noise during digitization, it should be assumed that $d_k < \delta_0$ for an unchanged image.

A Euclidian distance or an absolute amount may of course be chosen for the calculation instead of the cross-correlation described. The individual color values of the selected color space RGB or YUV must always be processed separately.

To analyze the value of the measure of similarity $d_k$ (k=0, 1, ... K), it is first stored in the motion analyzer 14 and then compared to the threshold values.

If $d_k < \delta_0$, this means that the movements in the sequential images are very slow or nil. In this case, the transfer of the values of $x^k$ to the long-term storage device 13 is stopped so that images will be available which have a sufficient motion differential.

In addition, images stored in the long-term memory device are used to generate the second image sequence in order to maintain the minimum stereo base width.

If $d_k > \delta_0$, the value of the approximation variables $\alpha$ will change as a function of the size of the measure of similarity $d_k$ relative to the threshold values $\delta_0$, $\delta_1$, $\delta_2$, as follows.

If $\delta_0 < d_k < \delta_2$ and $d_k - d_{k-1} \leq -\delta_1$ and as long as $\alpha \leq k-1$, then the approximation variable is set at $\alpha := \alpha + s$.

If $\delta_0 < d_k < \delta_2$ and $d_k - d_{k-1} > \delta_1$ and as long as $\alpha \geq 2$ ist, then the approximation variable is set at $\alpha := \alpha - s$.

The character s denotes a step width which is preferably 0.1, however, it can have other values as well.

If $\delta_0 < d_k < \delta_2$ and $-\delta_1 < d_k - d_{k-1} < \delta_1$, then the approximation variable will remain at $\alpha := \alpha$ because the motion velocity is substantially constant. In this case, no adjustment is necessary.

Finally, if $\delta_2 < d_k$, this means that the movement is very fast and the stereo base width would be too large. In this case, the approximation variable is set at $\alpha := 1/d_k$.

This dynamic motion control can also be switched off like the automatic phase control and replaced by manual entry; for example, using a keyboard via the device's second input.

The method described will preferably be implemented using a data processing program on a computer, in particular a digital image processing system for the generation of a three-dimensional depiction of television pictures transmitted or stored in a two-dimensional format.

In the following, a prefered example with specific values shall be given for the above embodiment. In case of application of the known PAL standard the horizontal resolution is I=576 and the vertical resolution is J=768, whereas for the NTSC standard, I=480 and J=640 are prescribed.

Generally it is sufficient to store the last five images in the image storage device 11 which means K:<5. As an initial value $\alpha_0$, the approximation variable is set to $\alpha_0 := 2.1$. For an adequate analysis of motion in sequential images the value of M is set to 1 or 2. The value of N should be chosen such that even in case of fast motions the scanning image is still within the search region. For this, a value of N of $20 \leq N \leq 30$ (especially N:=25) is adequate. However, the value of N can as well comprise the complete original image so that N:=J/2.

For defining the blurring, a value of $\epsilon := 1$ is proposed whereas for evaluating the measure of similarity the following values for the threshold values are preferably chosen: $\delta_0 := 0.05$, $\delta_1 := 0.6$ and $\delta_2 := 0.8$.

With an embodiment realized with these values a very natural three-dimensional reproduction could be obtained for image sequences with with very differently moving contents.

Finally, FIG. 4 shows a block diagram of a device (stereo decoder or stereo viewer) for the generation and depiction of 3-D images which are calculated based on a sequence of 2-D images transmitted over a transmission path or accessed from a storage medium.

The device comprises a first input 21, to which the 2-D images transmitted across a transmission path and demodulated or decompressed according to known techniques are connected. In addition, there is a second input 22, which is connected to a DVD player, a video recorder, or another source of images, for example.

Both of these inputs are connected to the invented device 23 according to FIG. 1, with which 3-D images are calculated based on the sequence of 2-D images according to the detailed explanation above. The outputs A1, A2 of this device, to which a sequence of left or right images $B_L$, $B_R$ is connected, are connected to a stereo storage device 24, 25, in which the images are stored for each channel.

Finally, different driver levels can be selected via a third input 26 by activating a selector switch 27, by means of which a corresponding image generator is controlled.

For example, a driver 28 for simulator goggles 29, a driver 30 for an autostereoscopic monitor 31, and a driver 32 for a stereo projector 33 are shown here.

This device is preferably designed as a component of a digital image processing system for the generation of a three-dimensional depiction of television pictures transmitted or stored in two dimensions.

The invention claimed is:

1. A method for the generation of 3-D images from a first sequence of 2-D images
    by calculating images in a second sequence of images, said calculated images being assigned to images of the first sequence by an approximation of image information which is temporally proximate to the images of the first sequence, an approximation variable ($\alpha$) determines the width of a stereo base, and
    by assigning a current image and the calculated image to respective viewing channels in relationship to the predominant direction of motion in the images of the first sequence, characterized in that a first measure of similarity ($d_k$) between sequential images of the first image sequence is determined and compared to predetermined threshold values ($\delta_0 < \delta_1 < \delta_2$), and
    (1) if $\delta_0 < d_k < \delta_2$ and $d_k - d_{k-1} \leq -\delta_1$ and as long as $\alpha \leq k-1$, the approximation variable is set to $\alpha := \alpha + s$,
    (2) if $\delta_0 < d_k < \delta_2$ and $d_k - d_{k-i} \geq \delta_1$ and as long as $\alpha \geq s$, the approximation variable is set to $\alpha := \alpha - s$, wherein s denotes a step width and
    (3) if $\delta_2 < d_k$, the approximation variable is set to $\alpha := 1/d_k$.

2. A method according to claim 1, wherein 2-D images are transmitted across a transmission path and provided as an input.

3. A method according to claim 1, wherein 2-D images are provided as an input from a DVD player, a video recorder, or another source of images.

4. A computer program comprising program code means for conducting the steps of a method according to claim 1, wherein the computer program is at least one of run on a computer, or stored on a computer-readable data carrier.

5. Digital image processing system for the generation of a three-dimensional reproduction of television pictures transmitted or stored in two-dimensional format, characterized by a means for carrying out the method of claim 1.

6. A method according to claim 1, wherein the approximation of image information is an approximation of pixels in images which are temporally proximate to the images of the first sequence.

7. A method according to claim 1, wherein said respective viewing channels are left and right viewing channels.

8. Means for conducting a method for the generation of 3-D images from a first sequence of 2-D images by calculating images in a second sequence of images, said calculated images being assigned to images of the first sequence by an approximation of image information which is temporally proximate to the images of the first sequence, an approximation variable ($\alpha$) determines the width of a stereo base, and by assigning a current image and the calculated image to respective viewing channels in relationship to the predominant direction of motion in the images of the first sequence, the means comprising an image generator, for calculating an image of a second sequence of images for a current image of a first sequence of 2-D images, by an approximation of pixels of images which are temporally proximate to the current image of the first sequence, by means of an approximation variable ($\alpha$) which determines the width of a stereo base, a motion analyzer, with which a first measure of similarity ($d_k$) is determined indicating a velocity of motion in sequential images of the first image sequence, and for comparing the same with predetermined threshold values ($\delta_0 < \delta_1 < \delta_2$), wherein if $\delta_0 < d_k < \delta_2$ and $d_k - d_{k-j} \leq -\delta_1$ and as long as $\alpha \leq k-1$, the approximation variable is set to $\alpha := \alpha + s$ and if $\delta_0 < d_k < \delta_2$ and $d_k - d_{k-j} \geq \delta_1$ and as long as $\alpha \geq s$, the approximation variable is set to $\alpha := \alpha - s$, wherein s denotes a step width, a phase analyzer, with which a predominant direction of motion in sequential images of the first image sequence is determined, and a phase selector, with which the current image and the calculated image is are assigned to a left and right viewing channel, respectively, in dependence of the predominant direction of motion in sequential images of the first sequence.

* * * * *

UNITED STATES PATENT AND TRADEMARK OFFICE
CERTIFICATE OF CORRECTION

| | | |
|---|---|---|
| PATENT NO. | : 7,254,264 B2 | Page 1 of 1 |
| APPLICATION NO. | : 10/240556 | |
| DATED | : August 7, 2007 | |
| INVENTOR(S) | : Rolf-Dieter Naske | |

It is certified that error appears in the above-identified patent and that said Letters Patent is hereby corrected as shown below:

Column 6, claim 1, line 54, please replace "$d_k - d_{k-i} \geq \delta_1$" with --$d_k - d_{k-1} \geq \delta_1$--.

Column 8, claim 8, line 9, please replace "$d_k - d_{k-j} \leq \delta_1$" with --$d_k - d_{k-1} \leq \delta_1$--.

Column 8, claim 8, line 11, please replace "$d_k - d_{k-j} \geq \delta_1$" with --$d_k - d_{k-1} \geq \delta_1$--.

Signed and Sealed this

Twenty-third Day of October, 2007

JON W. DUDAS
*Director of the United States Patent and Trademark Office*